United States Patent
Stockmaster et al.

(10) Patent No.: US 7,190,746 B1
(45) Date of Patent: Mar. 13, 2007

(54) MULTIPLE LOBE DOT PRODUCT DETECTOR FOR M-CODE GPS RECEIVERS

(75) Inventors: Michael H. Stockmaster, Cedar Rapids, IA (US); Thomas V. DeWulf, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 720 days.

(21) Appl. No.: 10/367,455

(22) Filed: Feb. 14, 2003

(51) Int. Cl.
*H03D 1/00* (2006.01)

(52) U.S. Cl. ............... 375/343; 375/316; 342/357.12; 342/357.06; 342/378; 342/379; 342/380; 342/381; 342/382; 342/383; 342/384

(58) Field of Classification Search ............... 375/343, 375/316, 150, 152; 342/357.12, 357.06, 342/378–384
See application file for complete search history.

(56) References Cited

U.S. PATENT DOCUMENTS

| | | | |
|---|---|---|---|
| 5,390,207 A | 2/1995 | Fenton et al. .................. 375/1 |
| 5,600,706 A | 2/1997 | Dunn et al. .................... 379/59 |
| 6,044,105 A * | 3/2000 | Gronemeyer ............... 375/152 |
| 6,195,328 B1 | 2/2001 | Tsui et al. .................... 370/210 |
| 6,297,769 B1 * | 10/2001 | Deines et al. .......... 342/357.12 |
| 6,430,213 B1 | 8/2002 | Dafesh ........................ 375/146 |
| 6,535,801 B1 * | 3/2003 | Geier et al. ................... 701/13 |
| 2003/0165186 A1 * | 9/2003 | Kohli et al. ................. 375/150 |

OTHER PUBLICATIONS

Brad, J. et al. "Testing the Effects of M-Code on GPS Timing Receivers", 31st Annual Precise Time and Time Interval (PTTI) Meeting (1999), pp. 365-371/372, retrieved from the Internet from http://tycho.usno.navy.mil/ptti/ptti99/PTTI_1999_365.PDF on Feb. 11, 2003.

Betz, John W., "Design and Performance of Code Tracking for the GPS M Code Signal", pp. 1-11, retrieved from the Internet from www.mitre.org/support/papers/tech_papers99_00/betz_codetracking/betz_codetracking.pdf.

Barker, Brian C. et al."Overview of the GPS M Code Signal", pp. 1-8, retrieved from the Internet from www.mitre.org/support/papers/tech_papers99_00/betz_overview/betz_overview.pdf.

Kaplan, Elliott D. *Understanding GPS: Principles and Applications*, pp. 142-150, ©1996 Artech House, Inc.

* cited by examiner

*Primary Examiner*—Mohammed Ghayour
*Assistant Examiner*—Leila Malek
(74) *Attorney, Agent, or Firm*—Nathan O. Jensen; Kyle Eppele

(57) ABSTRACT

A positioning system receiver is disclosed. The positioning system receiver includes an antenna for receiving radio frequency (RF) signals. The positioning system receiver also includes a radio frequency front end system configured to convert the received RF signals into intermediate frequency signals. The positioning system receiver further includes a digital processing and correlation system, receiving the intermediate frequency signals and including a plurality of taps on the autocorrelation function main lobe and a plurality of taps on at least one of the autocorrelation function side lobes. The digital processing and correlation system uses the signals received from the taps in a dot product detector algorithm to improve the signal-to-noise ratio of the receiver system.

17 Claims, 3 Drawing Sheets

MULTIPLE LOBE DOT PRODUCT DETECTOR FOR M-CODE GPS RECEIVERS

STATEMENT REGARDING FEDERALLY SPONSORED RESEARCH OR DEVELOPMENT

The invention was made with U.S. Government support under contract no. F33615-01-C-1825 for the Direct M Code Program Research and Development Announcement contract and the U.S. Government has certain rights in this invention.

BACKGROUND

The Global Positioning System (GPS) is undergoing a transformation in terms of satellite hardware and code signals used. This transformation includes a redefinition of GPS from a military service with the guarantee of civil use to a true dual service. The transformation includes a new civil L5 frequency and a military acquisition signal at the L1 and L2 frequencies for enhanced military and civil use.

The new M-code signal at the L1 and L2 frequencies consists of the product of a military data modulation multiplied by a spreading code modulation. The M-code signal is designed to be more robust and be more usable than the present P-code, Y-code system in current use. The M-code waveform places signal energy in the nulls of the current Y-code signal, for example, see FIG. 1 which depicts the present P-code and Y-code signals and the C/A code signals. FIG. 2 depicts the M-code signals which, as stated previously, fills the nulls of the P-code and Y-code signals. Like the current Y-code signal, M-code is only for authorized users and is not available to the general public outside of the military. The M-code signal modulation is designed to provide enhanced capability for military users of GPS. Currently, the GPS L1 frequency (1575.42 MHz) has two signals modulated on it, the C/A-code and the P/Y-code. The spectra of these modulations are characterized by a strong central peak surrounded by deep nulls at the modulation chip rate and its multiples. For C/A code, the chip rate is 1.023 MHz and for P/Y-code, the chip rate is 10.23 MHz. The GPS L2 frequency (1227.6 MHz) is similar but currently has only P/Y-code modulation. In the future, L2 may include a C/A-code signal to allow civil use of the frequency. M-code is a split spectrum signal with little energy at the carrier frequency and major lobes spaced away from the carrier. The side peaks in the modulation spectrum are intentionally put in nulls of the P/Y-code. This has the benefit of minimizing interference between the new signal and the old ones. It also is specifically designed to keep military signal energy away from the civil C/A-code signal. The M-code signal will be able to operate at powers tens of decibels higher than the current signals.

As always, in any signal processing system, it would be beneficial to provide for improved signal-to-noise ratio for the GPS receiver. Thus, using the new M-code, which provides the availability of side lobes in the autocorrelation function, as compared to the single peak of the conventional P/Y-code correlation function, improvements may be made. There is a need for a GPS detector which uses the information in the side lobes to improve signal-to-noise ratio in the output function. Further, there is a need for providing extra taps on the autocorrelation function side lobes to provide for better performance of the GPS receiver.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One example of the invention relates to a positioning system receiver. The positioning system receiver includes an antenna for receiving radio frequency (RF) signals. The positioning system receiver also includes a radio frequency front end system configured to convert the received RF signals into intermediate frequency signals. The positioning system receiver further includes a digital processing and correlation system, receiving the intermediate frequency signals and including a plurality of taps on the autocorrelation function main lobe and a plurality of taps on at least one of the autocorrelation function side lobes. The digital processing and correlation system uses the signals received from the taps in a delay detector algorithm to improve the signal-to-noise ratio of the receiver system.

Another example of the invention relates to a digital processing and correlation system that is configured to be used in a global positioning system receiver, receiving M-code signals. The digital processing and correlation system includes a circuit receiving intermediate frequency signals generated by a radio frequency front end. The digital processing and correlation system also includes a plurality of taps on the autocorrelation function main lobe and a plurality of taps on at least one of the autocorrelation function side lobes. The digital processing and correlation system uses the signals received from the taps in a dot product detector algorithm to improve the signal-to-noise ratio of the receiver system.

Yet another example of the invention relates to a method of improving the signal-to-noise ratio of an M-code global positioning system receiver. The method includes providing early, late, and prompt taps on the main lobe of an M-code autocorrelator function. The method also includes providing early, late, and prompt taps on a first side lobe of the M-code autocorrelator function.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
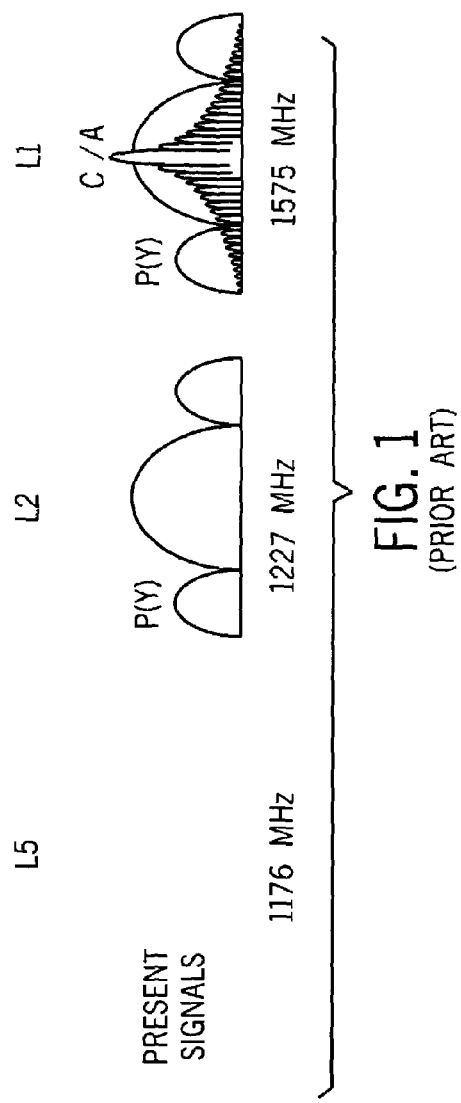
FIG. 1 is an exemplary diagram of conventional P/Y-code and C/A-code signals.
Figure 2:
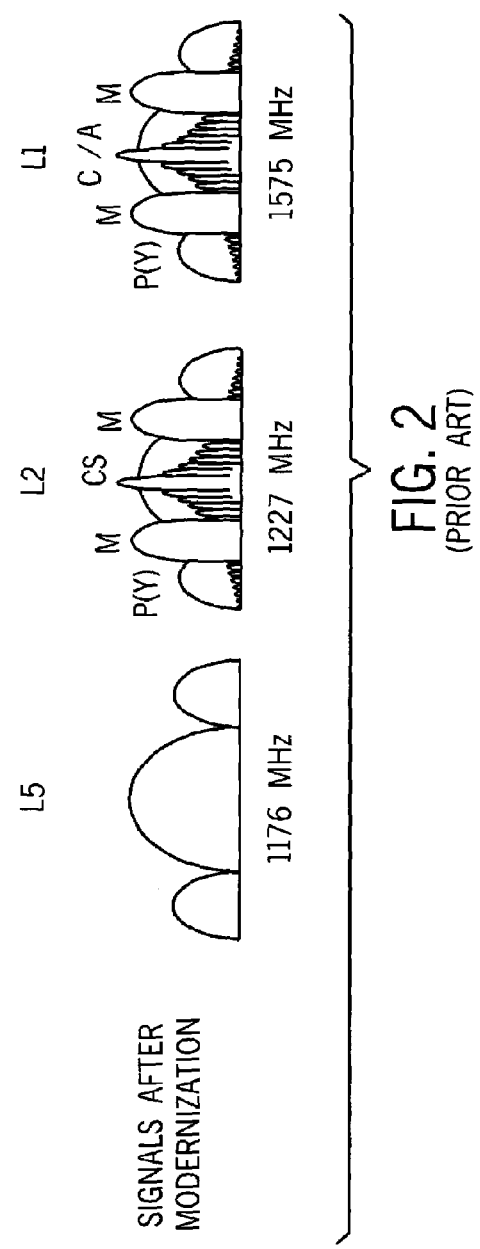
FIG. 2 is an exemplary depiction of new GPS signals including signals on the L5 band and M-code signals on the L1 and L2 bands.

Before describing, in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 3:
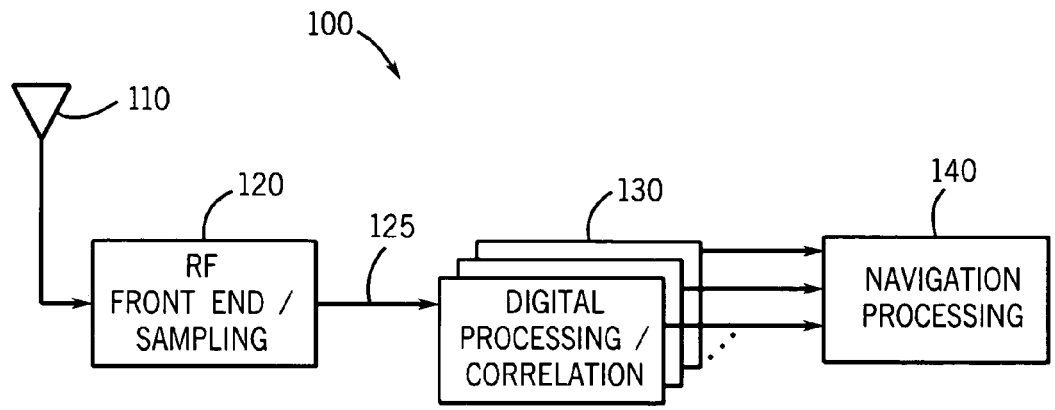
FIG. 3 is an exemplary block diagram of a GPS receiver architecture.

Referring now to FIG. 3, a system 100 is depicted for receiving M-code GPS signals. The receiver includes an antenna 110, receiving the radio frequency signal. Antenna 110 is coupled to an RF front end sampling system 120. In front end 120, signals received at L1 and L2 are translated to an intermediate frequency, where they are digitized. This down conversion is typically done in one or two stages, however, although any number of stages may be used. M-code receivers may use frequency plans that are similar to those of current military receivers. The baseline M-code receiver architecture may provide for reception of C/A-code and Y-code, although this is not necessary for operation of the M-code receiver system.

The spectrum of the M-code signal extends beyond the bandwidth of the 20 MHz nominal bandwidth of the Y-code, when one looks at the power spectrum densities of the M-code signals. The M-code signal extends to the edges of a 24 MHz bandwidth. Increased reliance on the signal near the band edge requires antennas and front end filters which may have wider bandwidths and less distortion of gain and phase, while still rejecting out of band interference. Moreover, because there is increased reliance on the signal near the band edge, it is increasingly important that the signal-to-noise ratio be kept at a maximum. Since analog filters introduce phase distortion near the transition region of the filter, the bandwidth of selection filters may be somewhat wider than 24 MHz in some applications. Subsequent digital filtering may then reduce the bandwidth of the sampled signal, attenuating the band edges without phase distortion. Because such an implementation requires higher sampling rates and subsequent signal processing for decimation, other alternatives may be preferred in some applications, depending on considerations such as the level of technology available, the degree of performance needed, antenna constraints, and issues of size, weight and power. Such solutions may include the inventive use of multiple taps on side lobes of the M-code correlation function which results in improvement of signal-to-noise ratios.

In conventional systems, early, prompt, and late taps are representative of the typical minimum processing that is used and the code-tracking loop of a typical military receiver.

Figure 4:
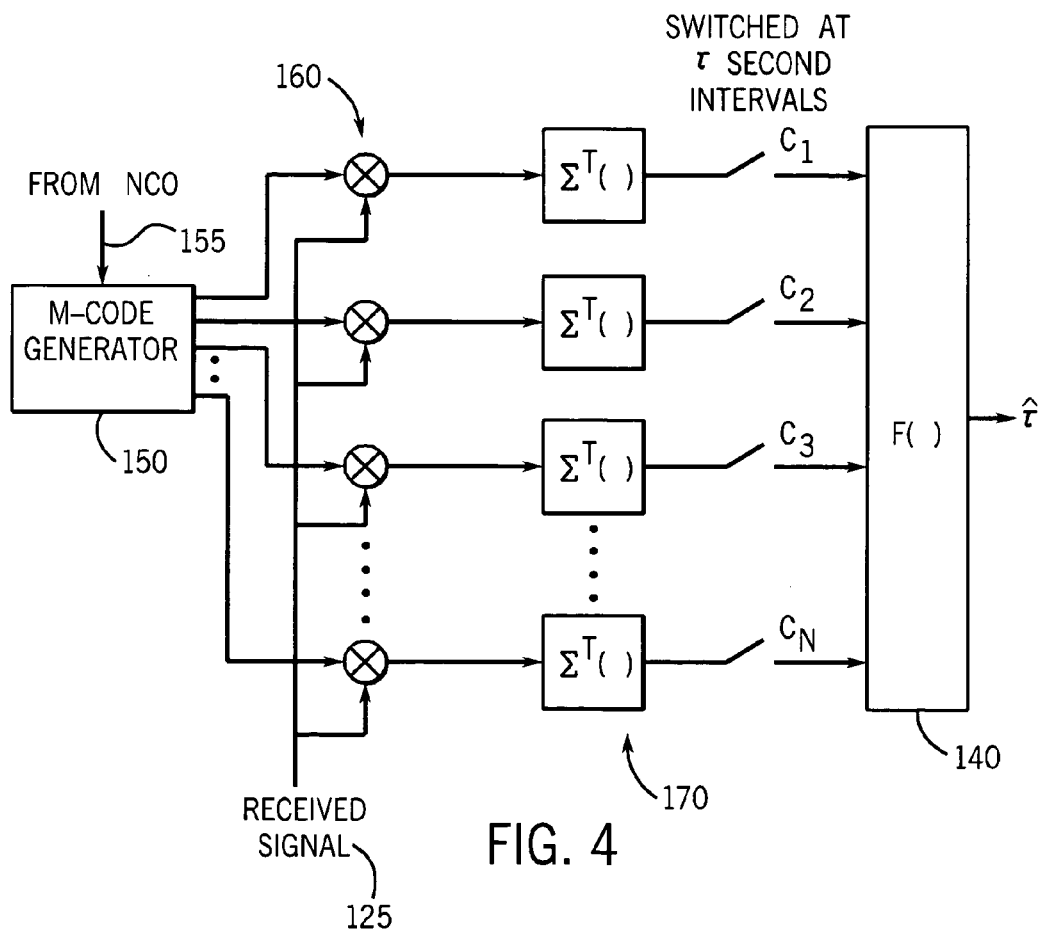
FIG. 4 is an exemplary diagram of a digital processing and correlation subsystem.
Figure 5:
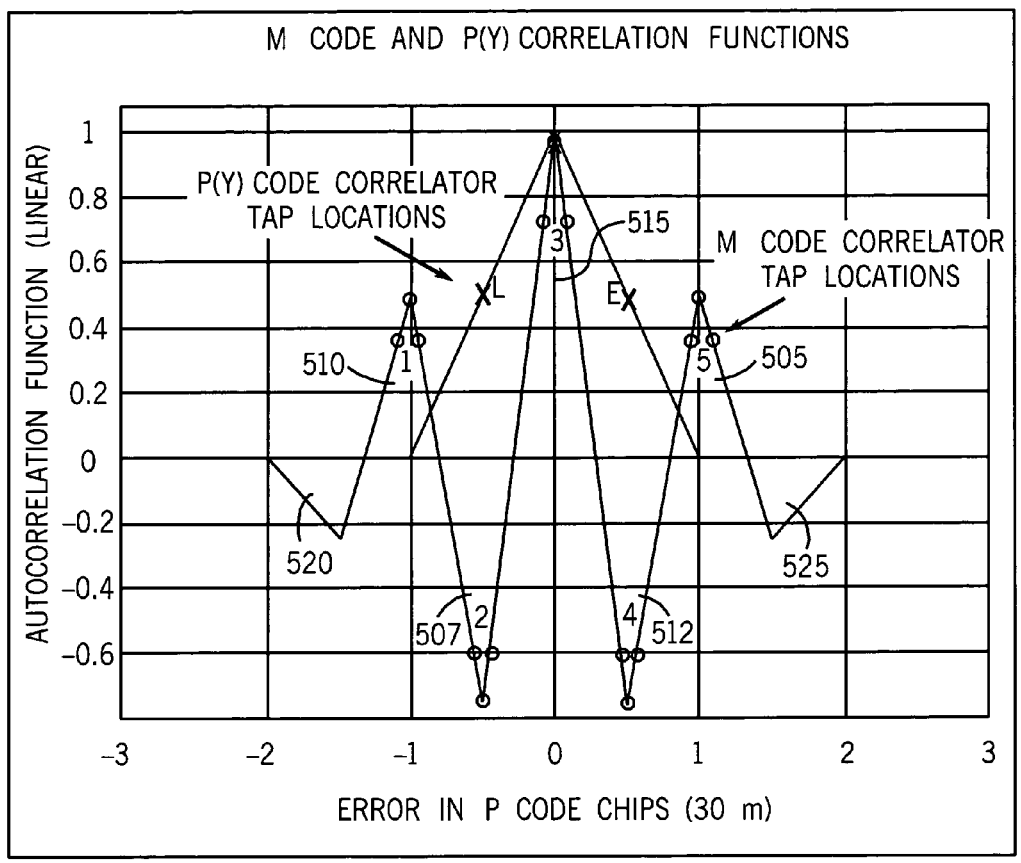
FIG. 5 is an exemplary depiction of the M-code and P/Y-code autocorrelation functions.

Referring again to FIG. 3, digital processing and correlation functions 130 receive the intermediate signal 125 from front end 120. The output of the digital processing correlation is provided to a navigation processing function 140, also depicted in FIG. 4. In a typical implementation which may be known to those skilled in the art, the received intermediate signal 125 is provided to a plurality of exclusive OR's is combined with information from M-code generator 150 in FIG. 4. M-code generator 150 receives a numerically controlled oscillator (NCO) signal 155 and produces the M-code delivered to the exclusive OR functions 160. A plurality of correlator taps 170 are provided which provide information to navigation processing 140. In a conventional P/Y-code correlator, a single peak, as depicted in FIG. 5, is characteristic. Typically the P/Y-code correlator taps correspond to early (E), late (L), and prompt (P) for the typical receiver. The standard detector utilizes these three taps. However, the M-code autocorrelation function includes side lobes 505 and 510 as well as main lobe 515. As well, the M-code correlator function includes side lobes 507 and 512. In an alternative embodiment, it may further be possible to include correlator taps at other locations including side lobes 520 and 525. In accordance with the invention, correlator taps are positioned at and adjacent the peaks of the M-code correlator function. For example, adjacent positions 1, 2, 3, 4, and 5 as depicted in FIG. 5. As compared with the conventional P/Y-code correlator tap locations, the tap locations of the M-code correlator are spaced closer together. In a conventional P/Y-code dot product detector the following dot product function is used

[(E−L)·P/PP], where PP is prompt power.

However, a similar dot product detector, using multiple correlator lobe taps, may be used for the M-code correlator as disclosed. The exemplary M-code dot product detector may be $$\sum_i [(E_i - L_i) \cdot P_i / PP_i],$$

where
i=2 to 4 for 3 lobe detector;
i=1 to 5 for 5 lobe detector; and
i=1 to 7 for 7 lobe detector.

The use of the new M-code dot product detector provides improvements in the signal-to-noise ratio (SNR) for the detector. For example, the improvements in the signal-to-noise ratio may be seen in the last column of the following table which is derived from an exemplary analysis of the three lobe detector and the five lobe detector, but is not provided to be limiting but only to provide an illustration of potential improvements using the side lobe detectors.

| Detector type | Total Signal Gain | $2^{nd}$ Lobe Gain | $3^{rd}$ Lobe Gain | Noise STD | SNR (20 * log 10 (Signal gain/ Noise STD)) | Improvement (dB) |
|---|---|---|---|---|---|---|
| Main only | 16 | N/A | N/A | 1 | 24.2 | 0 |
| Main + 2 | 74 | 29 | N/A | 2.7 | 28.8 | 4.6 |
| Main + 4 | 139 | N/A | 32 | 3.8 | 31.2 | 7 |

From the table, the noise is calculated as $$\frac{1}{\sqrt{3}}\left(1 + 2\left(\frac{29}{16}\right)\right)$$

for 3 lobe detectors and $$\frac{1}{\sqrt{5}}\left(1 + 2\left(\frac{29}{16}\right) + 2\left(\frac{32}{16}\right)\right)$$

for 5 lobe detectors. However, other analysis may be used to provide other results.

Accordingly, application of the multiple lobe correlator taps provides improved signal-to-noise ratio for the receiver detector and thus provides improved performance over other M-code detectors which may be conventionally used. It should be noted that other M-code delay detector formulations may also be applied without departing from the scope of the invention.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the electronic devices. For example, the type of electronic device used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A positioning system receiver, comprising:
an antenna for receiving radio frequency (RF) signals;
a radio frequency front end system configured to convert the received RF signals into intermediate frequency signals;
a digital processing and correlation system, receiving the intermediate frequency signals and including a plurality of taps on the autocorrelation function main lobe and a plurality of taps on at least one of the autocorrelation function side lobes, the digital processing and correlation system using the signals received from the taps in a delay detector algorithm to improve the signal-to-noise ratio of the receiver system.

2. The positioning system receiver of claim 1, wherein the delay detector uses early, late and prompt taps on the main lobe, and similarly positioned taps on the side lobes.

3. The positioning system receiver of claim 1, wherein there are a plurality of taps on at least two side lobes.

4. The positioning system receiver of claim 1, wherein there are a plurality of taps on at least four side lobes.

5. The positioning system receiver of claim 1, wherein there are a plurality of taps on at least six side lobes.

6. The positioning system receiver of claim 1, wherein the delay detector is a dot product detector.

7. A positioning system receiver, comprising:
an antenna for receiving radio frequency (RF) signals;
a radio frequency front end system configured to convert the received RF signals into intermediate frequency signals;
a digital processing and correlation system, receiving the intermediate frequency signals and including a plurality of taps on the autocorrelation function main lobe and a plurality of taps on at least one of the autocorrelation function side lobes, the digital processing and correlation system using the signals received from the taps in a delay detector algorithm to improve the signal-to-noise ratio of the receiver system; and
the delay detector is a dot product detector, wherein the dot product detector algorithm uses the summation over all of the lobes, of the difference in the early and late taps, the difference being multiplied by the ratio of the prompt tap to the prompt power.

8. The positioning system receiver of claim 7, wherein the dot product detector algorithm uses the summation that may be expressed in the following manner, $$\sum_i [(E_i - L_i) \cdot P_i / PP_i].$$

9. The positioning system receiver of claim 1, wherein the positioning system receiver is a global positioning system (GPS) receiver.

10. The positioning system receiver of claim 1, wherein the intermediate frequency signals received correspond to an M-code global positioning system (GPS) signal.

11. A digital processing and correlation system that is configured to be used in a global positioning system receiver, receiving M-code signals, comprising:
a circuit receiving intermediate frequency signals generated by a radio frequency front end;
a plurality of taps on the autocorrelation function main lobe and a plurality of taps on at least one of the autocorrelation function side lobes, the digital processing and correlation system using the signals received from the taps in a dot product detector algorithm to improve the signal-to-noise ratio of the receiver system.

12. The positioning system receiver of claim 11, wherein the dot product detector uses early, late and prompt taps on the main lobe, and similarly positioned taps on the side lobes.

13. The positioning system receiver of claim 11, wherein there are a plurality of taps on at least two side lobes.

14. The positioning system receiver of claim 11, wherein there are a plurality of taps on at least four side lobes.

15. The positioning system receiver of claim 11, wherein there are a plurality of taps on six side lobes.

16. A digital processing and correlation system that is configured to be used in a global positioning system receiver, receiving M-code signals, comprising:
a circuit receiving intermediate frequency signals generated by a radio frequency front end; and
a plurality of taps on the autocorrelation function main lobe and a plurality of taps on at least one of the autocorrelation function side lobes, the digital processing and correlation system using the signals received from the taps in a dot product detector algorithm to improve the signal-to-noise ratio of the receiver system, wherein the dot product detector algorithm uses the summation over all of the lobes, of the difference in the early and late taps, the difference being multiplied by the ratio of the prompt tap to the prompt power.

17. The positioning system receiver of claim 16, wherein the dot product detector algorithm uses the summation that may be expressed in the following manner, $$\sum_i [(E_i - L_i) \cdot P_i / PP_i].$$

* * * * *